INVENTOR.
DANIEL KORNBLUM
BY
ATTORNEYS

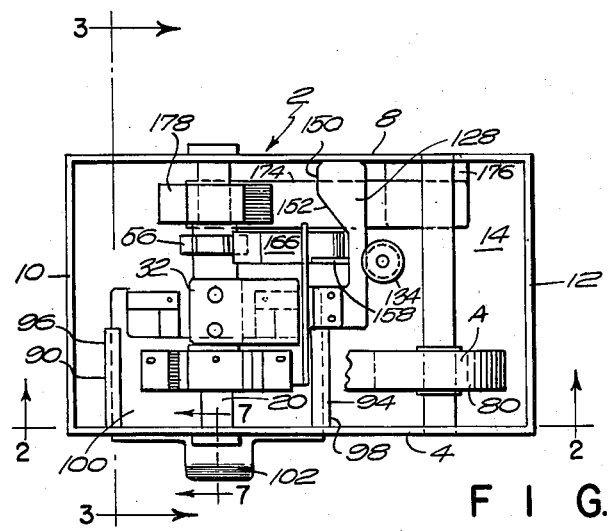

Jan. 7, 1964 D. KORNBLUM 3,117,051
FILM SPLICER
Filed June 24, 1960 4 Sheets-Sheet 4

INVENTOR.
DANIEL KORNBLUM
BY
ATTORNEYS

3,117,051
FILM SPLICER
Daniel Kornblum, Natick, Mass. (4606 W. Central Ave., Toledo 15, Ohio), assignor of one-third to Lloyd N. Spindell, Brookline, Mass.
Filed June 24, 1960, Ser. No. 38,661
7 Claims. (Cl. 156—506)

This invention relates to a film splicer, and more particularly, to a device for automatically applying a splicing tape to two sections of motion picture film whereby to effect a permanent and satisfactory splice.

As is well known, there is available an adhesive-backed transparent plastic tape for splicing together two sections of motion picture film. This splicing tape usually has a masking over the adhesive, the masking being removed at the time of application of the tape to the film which is to be spliced. When properly applied this splicing tape will make a good splice. Unfortunately, application of the tape has been a bothersome chore, being accomplished either by hand or by a rudimentary old-fashioned hand operated splicer unit. Lacking a suitable splicer, consistently good results have been difficult to obtain.

Accordingly, it is the primary object of the present invention to provide a novel film splicer which is capable of automatically applying a predetermined length of splicing tape to two pieces of motion picture film whereby to effect a permanent and satisfactory splice.

A more specific object of the present invention is to provide a novel film splicer comprising two rotatable elements for applying splicing tape to the opposite surfaces of two pieces of film, whereby to splice them together.

A further specific object of the present invention is to provide an automatic film splicer comprising a tray adapted to support two pieces of film whose ends are to be spliced, and means cooperating with said tray for applying a splicing tape to the two pieces of film when the tray is moved along a predetermined path.

A further object of the present invention is to provide a motion picture splicer which comprises means for supporting a roll of adhesive-backed splicing tape, and means for feeding tape from said roll and applying it in selected lengths to two pieces of motion picture film, whereby to splice them together.

Other objects and many of the attendant advantages of the present invention will become readily apparent from the following detailed specification when considered together with the accompanying drawings wherein:

FIG. 1 is a plan view of a device embodying the present invention;

FIG. 2 is a vertical section taken along line 2—2 of FIG. 1;

Figure 3:
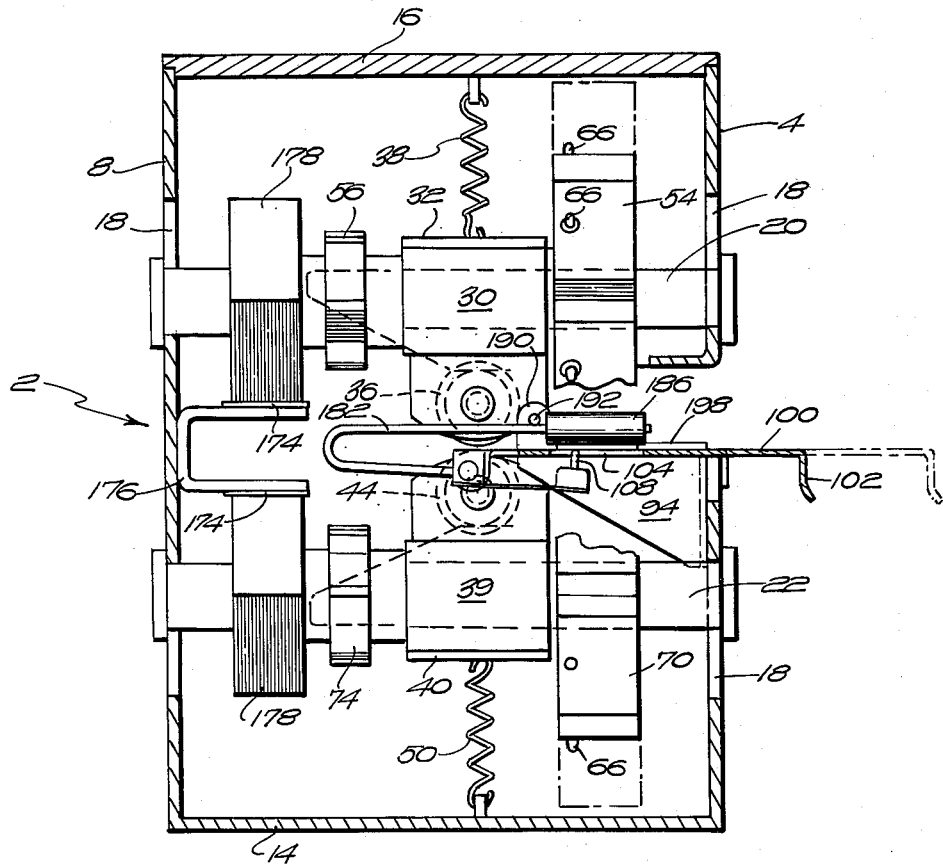
FIG. 3 is a vertical section taken along line 3—3 of FIG. 1.

Turning first to FIGS. 1, 2 and 3, the various components of the illustrated splicer are housed within a box-like container 2 comprising front and rear walls 4 and 8, side walls 10 and 12, bottom wall 14, and a top wall 16. Mounted in elongated vertical slots 18 in the front and rear walls 4 and 8 are two shafts 20 and 22. Two other shafts 24 and 26 are also mounted in the front and rear walls. However, shafts 24 and 26 are fixed against movement whereas shafts 20 and 22 can move up and down along the paths defined by the slots in the front and rear walls 4 and 8, respectively. Shaft 20 is mounted in a bearing 30 to which is secured a bracket 32 having a depending portion 34 (FIG. 2) on which is mounted a cam roller 36. A spring 38 (FIGS. 2 and 3) is connected to bracket 32 and also to the top wall 16. Spring 38 urges shaft 20 toward the top wall away from the bottom shaft 22.

The bottom shaft 22 has a corresponding bearing 39 which is provided with a corresponding bracket 40 having an upstanding portion 42 (FIG. 2) provided with a cam roller 44. A spring 50 is connected between bracket 40 and the bottom wall 14. Spring 50 draws shaft 22 away from the top shaft 20.

Mounted on the top shaft 20 is a splicer wheel 54 and a star gear 56. The splicer wheel 54 is provided with a plurality of slots 58 which delineate a plurality of land areas 60. Each of these land areas 60 is provided with a tapped hole 62 (FIG. 5) in which is mounted an annular plug 64. Plug 64 acts to retain a tapered pin 66 which is provided with a shoulder 68 which prevents it from passing completely through the plug 64. A compression spring 67 is mounted in each hole 62. Each compression spring acts to keep the associated pin 66 in projecting relation to the splicer wheel.

The bottom shaft 22 has a corresponding splicer wheel 70. The star gear 56 has as many teeth as there are land areas 60 on the top splicer wheel 54. A second identical star gear 74 is mounted on the bottom shaft 22.

Figure 5:
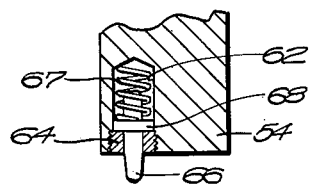
FIG. 5 is a fragmentary sectional view showing a detail of the present invention.

The two shafts 24 and 26 are provided with feed rolls 80 and 82 respectively which are in line with the two splicer wheels 54 and 70. Feed rolls 80 and 82 carry identical splicing tapes A and B. As seen best in FIG. 4, splicing tapes A and B are provided with sprocket holes 86 and 88 respectively. These sprocket holes occur at spaced intervals corresponding with the spacing between the pins 66 carried by the splicer wheels 54 and 70. At this point it is to be observed that the pins 66 are tapered, as shown in FIG. 5. At the same time it is to be noted that the size of the sprocket holes 86 and 88 is such that the pins 66 tend to wedge themselves in the holes 86 and 88. In this way the pins easily retain the splicing tape on the wheels.

The feed rolls 80 and 82 are rotatable on the shafts 24 and 26. Initially, the tapes A and B are brought manually into contact with splicing wheels 54 and 70 respectively, being positioned so that each wheel will have a pin 66 disposed in one of the sprocket holes of the tape associated therewith. Thus when the shafts 20 and 22 are rotated, the tapes will unwind from the feed rolls 80 and 82.

Secured to the front wall 4 of the device are two brackets 90 and 94. These brackets extend rearwardly away from the front wall 4 and are provided at their top edge with reversed flanges 96 and 98 which form guide channels in which are disposed the opposite edges of a tray 100. Tray 100 is slidable in a direction normal to the front and rear walls of the device. It is to be observed that the front wall 4 is provided with an opening whereby the tray 100 may be pulled out. It is to be observed also that tray 100 has a tab 102 formed at its front edge so that it may be gripped by the user. Tray 100 also has a rectangular aperture 104 formed at its center. This aperture or window provides an edge 106 which cooperates with a knife blade hereinafter described to cut off ends of film which are to be spliced. Tray 100 also has a plurality of upwardly projecting pins 108, located on opposite sides of the window 104. These pins 108 are resiliently mounted so that when they are pressed down, they will disappear into the plane of the tray 100.

Attached to the upper side of tray 100 is a bracket 110 which provides an inclined cam surface 114 which is disposed so as to engage the upper cam roller 36. Attached to the bottom side of tray 100 is a second bracket 116 (FIG. 4) which provides a second cam surface 118 which is disposed so as to engage the bottom cam roller 44. When the tray is moved toward the rear wall 8, cam surface 114 will act on cam roller 36 to draw the upper shaft 20 downward. Similarly the bottom cam surface 118 will act on roller 44 to force the bottom shaft 22 up toward the top shaft 20.

Attached to bracket 110 is a small L-shaped bracket 120. Attached to the bracket 116 is a similar L-shaped bracket 122. Brackets 120 and 122 support identical cam members 128 and 130. These cam members extend rearwardly. They are guided by guide wheels 134 and 136 which are mounted on a shaft 138 whose ends are secured in the bottom wall 14 and the upper wall 16. The guide wheels 134 and 136 are rotatable on shaft 138 and are provided with grooves 140 (FIG. 2) in which the cam elements 128 and 130 are disposed.

Figure 4:
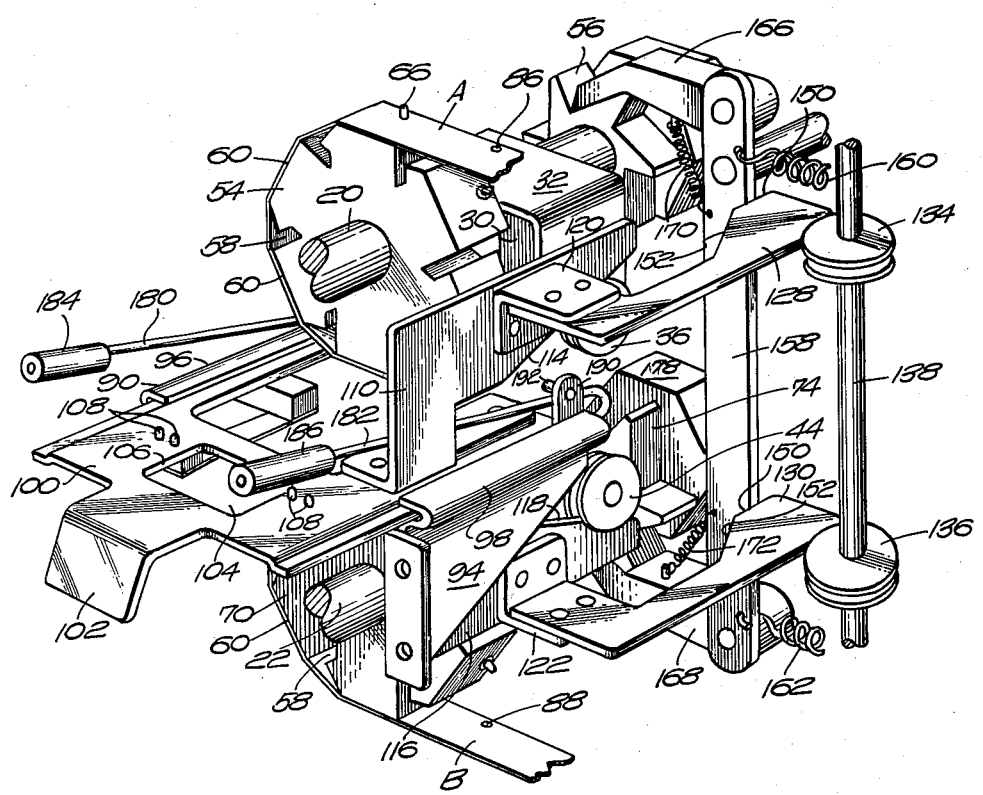
FIG. 4 is a perspective view illustrating the operating elements of the splicer shown in FIGS. 1–3.
Figure 6:
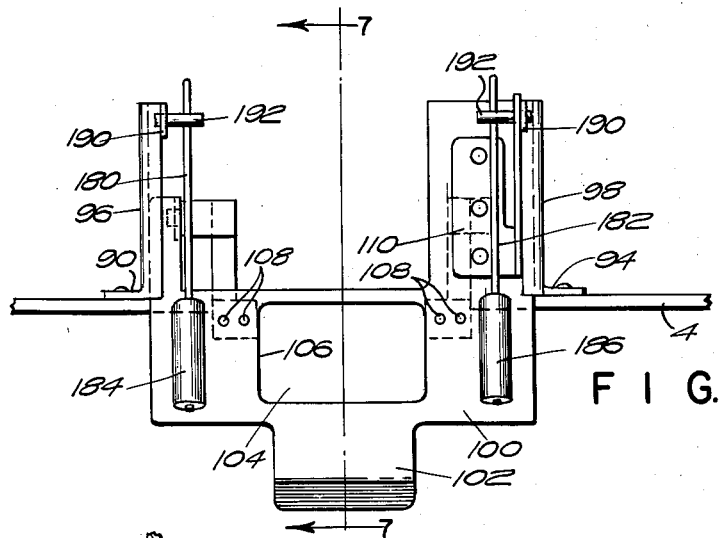
FIG. 6 is a plan view illustrating details of the slidable tray assembly.

The two cam elements 128 and 130 have a first cam surface 150 which extends normal to the front and rear walls 4 and 8 and a second cam 152 surface which extends at an oblique angle to the front and rear walls. The two cam elements 128 and 130 operate a vertically extending lever 158 which is coupled to springs 160 and 162. The opposite ends of these springs are attached to the side wall 12 of the device. Means (not shown) are provided to prevent lever 158 from moving vertically while at the same time permitting it to be moved horizontally. Lever 158 is provided at its top and bottom ends with identical pawls 166 and 168. As illustrated in FIG. 4, these pawls are disposed in reverse fashion, with the upper pawl 166 engaging the top star gear 56 and the bottom pawl 168 engaging the bottom star gear 74. Small tension springs 170 and 172 act to hold the pawls in engagement with the star gears. Elimination of override and backlash of shafts 20 and 22 so as to obtain proper registration of wheels 54 and 70 is obtained by two leaf spring elements 174 which are supported by a rear wall bracket 176. Springs 174 act on hexagonal-shaped blocks 178 mounted on shafts 20 and 22 to limit rotation of the shafts by pawls 166 and 168.

When the tray is pulled out to the position indicated in dotted lines in FIG. 3, the first cam surfaces 150 are in engagement with the vertical lever 158. When the tray is pushed in, the obliquely disposed cam surfaces 152 engage lever 158.

The operating action is as follows: When the tray is pushed in, the springs 160 and 162 will draw the vertical lever 158 away from the two star wheels. This permits the pawls to be shifted so as to engage the next successive teeth on the two star wheels. When the tray is pulled out again, the cam surfaces 150 will force the vertical lever 158 toward the two star wheels. As a result, the two pawls 166 and 168 will cause the star wheels to advance one position.

Of course, cam elements 128 and 130 need not be exactly as shown, but may be modified. Thus, for example, these cam elements may be varied so as to cause rotation of shafts 20 and 22 while the tray is being pushed in, rather than when it is being pulled out.

Figure 7:
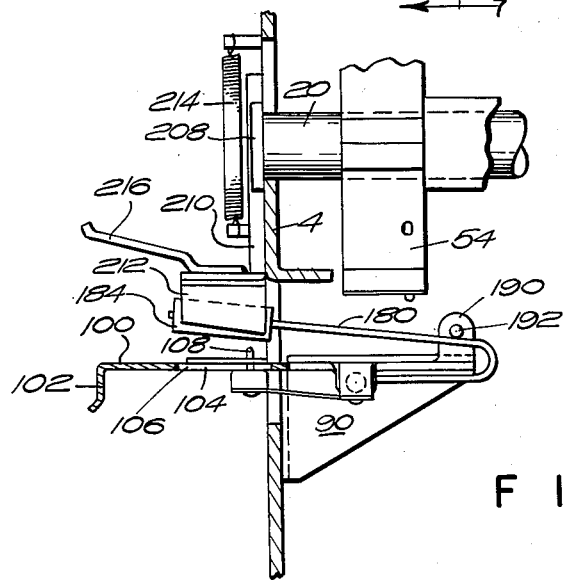
FIG. 7 is a vertical sectional view taken along line 7—7 of FIG. 1.

Attached to slidable tray 100 at its rear end are two resilient rods 180 and 182. These rods are attached to the underside of tray 100 and are bent back over the top of the trays and normally reside at an inclined angle to the plane of the tray as shown in FIGS. 4 and 7. At their forward or free ends these rods are provided with resilient elements 184 and 186. Preferably these resilient elements are made of rubber. Attached to the two guide brackets 90 and 94 are two upstanding elements 190 having pins 192 which extend inwardly toward the center of the slidable tray. The two resilient rods 180 and 182 extend beneath the pins 192. When the tray is pushed inward, the pins 192 act against the resilient rods 180 and 182 to force them down toward the tray 100. The pins 192 are so arranged that the resilient elements 184 and 186 will engage the tray (or film mounted on the tray) before the tray has been pushed in far enough to locate the aperture or window 104 directly between the two splicer wheels 54 and 70. At this point, it is to be noted that the cam surfaces 114 and 116 are so inclined that the two splicer wheels 54 and 70 will be flush with the tray just as it reaches the rear end of its stroke.

Attached to the side bracket 90 by means of supporting elements (not shown) are two knives 198 and 200. These knives are located so that they enter one of the slots 58 in the starwheel 54 when the latter is drawn downward due to the action of cam surface 114 on cam roller 44. A second pair of knife blades 202 and 204 is mounted in a corresponding manner so as to enter one of the slots 58 in the bottom splicer wheel 70 when the latter is forced upward due to the action of cam surface 118 on roller 44. Thus, assuming that splicing tapes A and B are on the two splicer wheels 54 and 70, when the wheels are drawn downward, the knife blades 200 and 204 will enter slots in the two starwheels and thereby sever a section of predetermined length from each of the tapes. The length of each land 60 and, therefore, the length of each piece of tape severed by knives 200 and 204, is equal in length to two picture frames. Of course, the length of the tape which is severed may be equal to one frame or, if desired, equal to more than two frames. Preferably, the length of tape which is severed is equal to a whole number of frames. The function of knives 198 and 200 is to sever each short section of tape extending between successive lands 60. The short sections are discarded.

Operation of the device is relatively simple and is as follows: Assume that two sections of film to be spliced have been mounted on the tray 100 with the pins 108 projecting through sprocket holes in the two pieces of film. Assume also that splicing tape is disposed on the two splicer wheels 54 and 70. When the tray is forced inward, the two splicer wheels will move down. As they do the knife blades 200 and 204 will enter selected slots 58 in the two starwheels, thereby severing identical lengths of tape from the two webs, A and B. The depth of the slots 58 is such as to permit the two starwheels to continue coming together toward the tray which is advancing toward them simultaneously. When the aperture of the tray is located directly between the wheels, the two wheels will make contact with the film on the tray. The two sections of tape which have been severed from the two webs will be pressed into firm contact with the film which is disposed in registration with the tray aperture 104. The two wheels will exert sufficient force to cause the two severed sections of the tape to adhere to the film. Of course, the film on the tray cannot move due to the sprocket pins 108 and also due to the pressure exerted by the two resilient members 184 and 186 which are brought down into firm engagement with the film as the tray is being forced rearwardly. When the tray is pulled back again, the wheels will move upwardly and the two grippers 184 and 186 will move out of contact with the film. When the tray has been fully pulled out, the spliced film may be removed simply by lifting it off of the tray.

In order to facilitate the making of a satisfactory splice, it is necessary to cut the film so as to form two straight edges which can be brought together to make a perfect butt joint. Accordingly, attached to the front wall 4 of the device is a guide element 208 (FIG. 7) which slidably supports an elongated member 210 which has secured at its bottom end a knife blade 212. The latter is in vertical registration with the edge 106 of aperture 104. A spring 214 is provided to elevate the knife blade 212 after it is used. A small handle 216 is attached to the knife support element 210 for the purpose of moving the knife blade downward for a cutting operation.

By placing the film on the tray with the sprocket pins 108 extending into suitable sprocket holes in the film, the film may be properly located for cutting. Assuming that a piece of film has been placed on the tray in the aforementioned manner, cutting is accomplished simply by drawing the knife blade down into the aperture 104. Both pieces of film to be spliced are cut in the same manner so that matching square edges are obtained.

It is believed to be apparent from the foregoing description that the illustrated device greatly facilitates the making of a satisfactory splice of two sections of movie film. All that the operator need do is place the two pieces of the film to be spliced on the tray so that their adjacent ends make a butt joint. Thereafter, simply by manipulating the tray in and out, there is obtained a perfect splice with splicing tape attached to both sides of the motion picture film.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. A device for splicing together two pieces of motion picture film comprising, a tray, means slidably supporting said tray for horizontal movement along a predetermined path, means on said tray for locating two pieces of film so that their adjacent ends form a butt joint with the joint line extending in the same direction as said predetermined path, and means for automatically applying a splicing tape to said butt joint when said tray is moved along said path, said last-mentioned means disposed to apply said tape so that its longitudinal edge extends transversely to said predetermined path and said joint line.

2. A device as defined by claim 1 wherein said tray has an aperture located so that said butt joint will be in registration therewith, and further wherein said tape applying means comprises two identical elements, one of said elements adapted to apply one tape to one side of said butt joint and the other of said elements adapted to apply other tape to the other side of said butt joint.

3. A device for splicing together two pieces of motion picture film, said device comprising a moveable tray for supporting two pieces of film with their adjacent ends in abutting relation, a roll supply of splicing tape arranged to feed tape along a path extending at right angles to the direction of movement of said tray, means for automatically severing from the tape fed from said roll supply a short section of tape, and means controlled by movement of said tray for applying said short section of tape to one side of said adjacent ends whereby to splice together said two pieces of film.

4. A device for splicing together two pieces of film, said device comprising first and second means for supplying splicing tape, means for supporting two pieces of film in predetermined end relation, said film-supporting means movable along a predetermined path at a right angle to the longitudinal axes of said pieces of film, first means responsive to movement of said film-supporting means for automatically severing a first short section of tape from the tape supplied by said first tape supplying means, second means responsive to movement of said film-supporting means for automatically severing a first short section of tape from the tape supplied by said second tape supplying means, and means for applying said first and second short sections of tape to opposite sides of the adjacent ends of said two pieces of film with said tape sections extending at right angles to said predetermined path, whereby to splice together said two pieces of film.

5. A device for splicing together two pieces of motion picture film comprising, a tray, means slideably supporting said tray for horizontal movement along a predetermined path, means on said tray for locating the two pieces of film so that their adjacent ends form a butt joint, and means for automatically applying a section of splicing tape to said butt joint when said tray is moved along said path, said tape-applying means comprising a rotatable member having a series of land surfaces and a series of slots occurring alternately with said land surfaces, and knife means cooperating with said slots for severing tape on said rotatable member into short sections equal in length to the corresponding dimension of said land surfaces.

6. A device for splicing together two pieces of motion picture film comprising, a tray, means slideably supporting said tray for horizontal movement along a predetermined path, means on said tray for locating two pieces of film so that their adjacent ends form a butt joint, and means for automatically applying a section of splicing tape to said butt joint when said tray is moved along said path, said tape-applying means comprising a rotatable member having a series of land surfaces and a series of slots occurring alternately with said land surfaces, said rotatable member being moveable vertically relative to said tray, and knife means cooperating with said slots for severing tape on said rotatable member into short sections equal in length to the corresponding dimension of said land surfaces.

7. A device for splicing together two pieces of motion picture film comprising, a tray, means slideably supporting said tray for horizontal movement along a predetermined path, means on said tray for locating two pieces of film so that their adjacent ends form a butt joint, and means for automatically applying a section of splicing tape to said butt joint when said tray is moved along said path, said tape-applying means comprising a rotatable member having a series of land surfaces and a series of slots occurring alternately with said land surfaces, said rotatable member moveable vertically relative to said tray, means for moving said rotatable member toward said tray as said tray moves in one direction along said path, means for moving said rotatable member away from said tray as said tray is moved in the opposite direction along said path, and knife means cooperating with said slots for severing tape on said rotatable member into short sections equal in length to the corresponding dimension of said land surfaces.

References Cited in the file of this patent

UNITED STATES PATENTS

| | | |
|---|---|---|
| 2,346,874 | Russell | Apr. 18, 1944 |
| 2,672,251 | Schwartz et al. | Mar. 16, 1954 |
| 2,842,184 | Manchester | July 8, 1958 |
| 2,855,022 | Drummond | Oct. 7, 1958 |
| 3,024,157 | Beerli | Mar. 6, 1962 |